Nov. 14, 1967     F. W. PROUDLOVE     3,352,207
GUN POD ENCLOSING A GUN AND A CARTRIDGE TANK CONNECTED
BY A CARTRIDGE CHUTE ENCLOSED IN A PYLON
CONNECTING THE POD TO AN AIRCRAFT

Filed March 28, 1966     2 Sheets-Sheet 1

Inventor
FRANK WILLIAM PROUDLOVE
By
Bailey, Stephens & Huettig
Attorneys

United States Patent Office 3,352,207
Patented Nov. 14, 1967

3,352,207
GUN POD ENCLOSING A GUN AND A CARTRIDGE TANK CONNECTED BY A CARTRIDGE CHUTE ENCLOSED IN A PYLON CONNECTING THE POD TO AN AIRCRAFT
Frank William Proudlove, Lytham Saint Anne's, England, assignor to British Aircraft Corporation (Operating) Limited, London, England, a British company
Filed Mar. 28, 1966, Ser. No. 538,028
Claims priority, application Great Britain, Apr. 8, 1965, 15,001/65
6 Claims. (Cl. 89—37.5)

ABSTRACT OF THE DISCLOSURE

A gun pod and pylon assembly which is of very low bulk, the pod enclosing a cartridge storing tank and a gun, the gun and the tank being interconnected by a chute which passes mainly through the pylon, the chute being of a form such that the general width of the pylon is substantially less than the length of a cartridge.

---

A gun pod mounted on an aircraft is generally required to contain an ammunition storage tank in the body of the pod and a gun pointing forwards from the forwardly pointing tip of the pod. The ammunition is conveniently supplied in the form of cartridges mounted on belts, the cartridges lying parallel to each other, and transversely to the belt. The belt holding the cartridge is stored in a folded condition in the tank and by known mechanisms is fed continuously to the gun as required. The most convenient arrangement is to have the belt folded in the storage tank, so that the cartridges lie horizontal and transverse to the axis of the gun pod. The belt must however extend forwards to the gun which requires to receive the cartridges pointing in the same forward direction as the gun pod. The cartridges are therefore required to be turned through 90° about an axis perpendicular to both their initial and final directions.

Cartridges are generally mounted on belts which are inextensible and which have a minimum radius of curvature. The cartridges cannot be turned through a curvature less than this about the axis perpendicular to the plane of the belt. A certain minimum radius of curvature from an ammunition supply chute which conveys the cartridge belt from the tank to the gun is therefore entailed.

Gun pods which are designed to satisfy requirements other than the accommodation of this minimum radius, are not of large enough diameter to totally enclose the chute. The chute therefore has to project outwards from the wall of the gun pod to accommodate the 90° bend in the belt. This is clearly undesirable from an aerodynamic point of view.

According to this invention the pylon encloses a chute which extends between the tank and the breech of the gun.

Preferably the chute is of a form to cause the cartridges to rotate about an axis parallel to that of the gun during the early part of their path through the chute.

Figure 1:
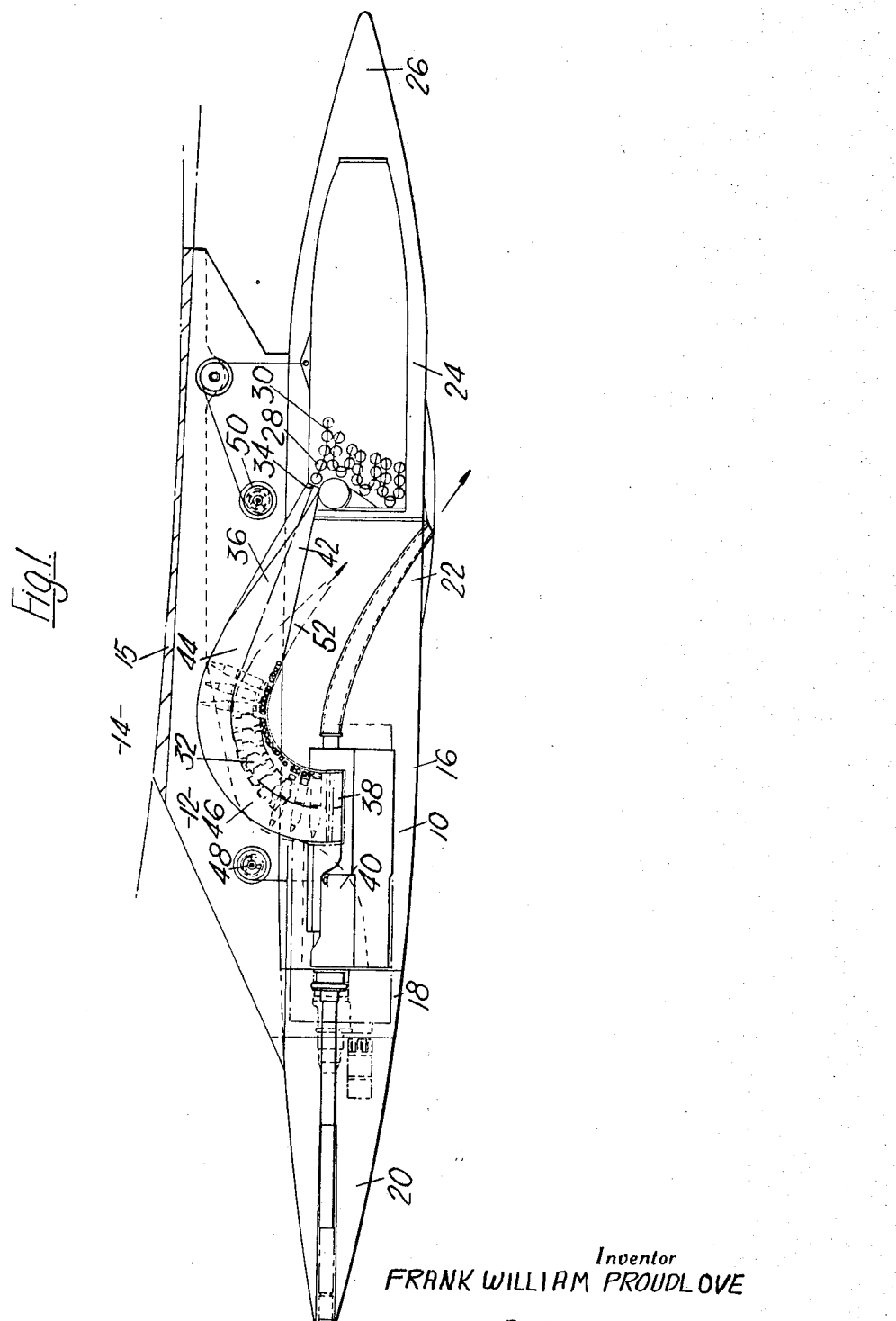
Figure 2:
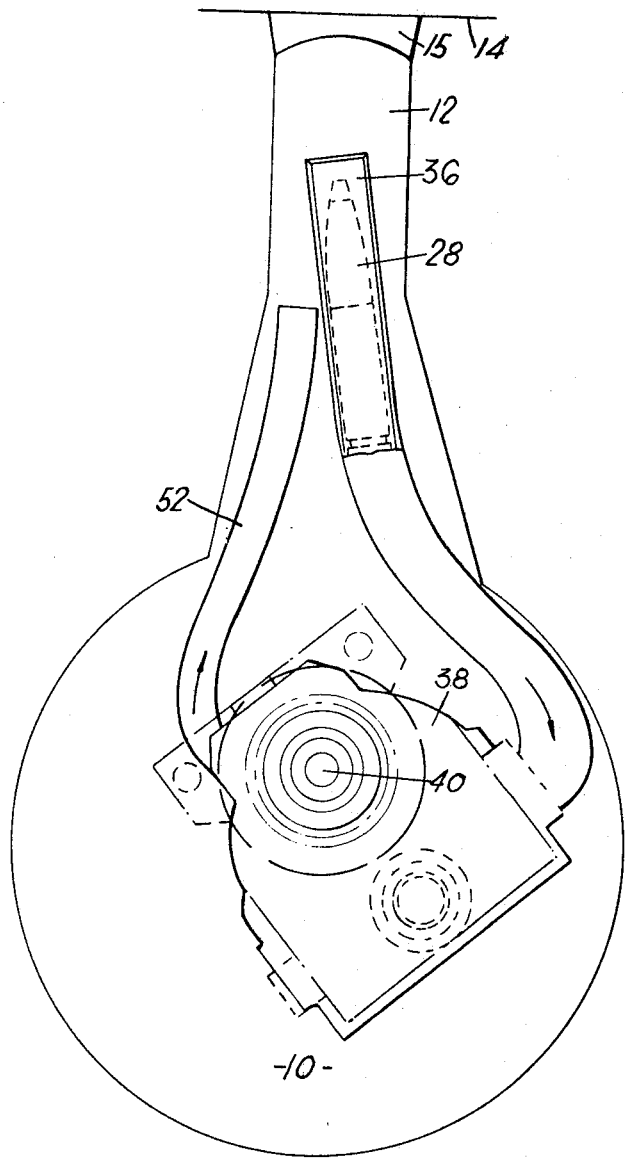

One example of an assembly according to the invention is described below with reference to the accompanying drawings in which:
FIGURE 1 is a sectioned side elevation; and
FIGURE 2 is an end elevation, the pod being merely shown in outline.

The assembly consists generally of a gun pod 10 mounted by means of a pylon 12 to the undersurface of an aircraft wing 14. An adapter plate 15 may be positioned to lie between the pylon and the aircraft, a variety of plates of different forms making it possible to fit the assembly to different aircraft.

The gun pod 10 comprises a gun bay 16 forward of which lie, in order, a gun mounting bay 18 and a nose bay 20. These three units are interchangeable to accommodate various guns. Rearwards of the gun lie, in order, a centre bay 22, an ammunition bay 24 and a tail 26.

The ammunition is conveniently supplied to the gun in the form of cartridges 28 lying transversely to and side by side along a belt like member 30 which is comprised of interconnected metal links 32.

The ammunition is stored for use within the ammunition bay 24, the belt like member lying loosely coiled into layers lying above one another; this is permitted by the flexibility of the belt which permits a hinging action of itself between each cartridge, the hinging being about axes transverse to the length of the belt.

The ammunition is delivered from the ammunition bay through a port 34 at the upper, forwardly lying corner edge of the ammunition bay. The port connects with a chute 36 which passes through the pylon 12 and connects at its other end to the breech 38 of the gun 40 in the gun bay 16.

By means of the chute, the cartridges pass single file from the ammunition store to the gun, their movement being energised by a mechanism at the breech which pulls the belt along by a distance sufficient to position the subsequent cartridge in the breech when the preceding cartridge has been fired. In order that no mechanism is required to control the motion of the belt other than that to merely pull the belt through, random lateral movement of the cartridges is eliminated by having the transverse form of the chute to be only a little larger than the form of the cartridges. This is best seen in FIGURE 2.

Substantial bodily movement of the cartridges however is readily achieved by suitable forming of the chute while keeping its form in section uniform.

The cartridges lie during storage in the bay 24 with their axes transverse to the axis of the pod. They require when received by the gun to lie pointing in the same direction as the pod. The change of direction required of the cartridge can most simply be achieved by having them rotate about an axis perpendicular to their initial and final directions during transfer from 24 to 38. This can be achieved by suitably fashioning the chute along which the cartridges pass.

Disregarding the form required of the chute, the diameter of the pod is dictated principally by the volume of the ammunition bay, and this per se leads to a slim pod of good aerodynamic profile.

Superposition of the chute having its curvature of the very minimum radius would lead to a substantial protrusion from the side wall of the pod, which protrusion would extend outwards by more than the radius of the pod, and would then be severely detrimental to smoothness of flow past the pod.

By means of this invention, the chute extends through the pylon 12, and it is formed to suitably twist the cartridges bodily during the first part 42 of their passage therethrough to cause them to change smoothly from their transverse attitude at 34 towards a radially outwards pointing one at 44. By this arrangement, the pylon remains much narrower than the pod, as is readily seen in FIGURE 2.

During the latter part 46 of the transference of the cartridges through the chute, the cartridges are rotated about an axis transverse of the pod, and the curvature can be readily accommodated, as seen in FIGURE 1, without interfering with the smooth contour of the pod profile.

As seen in FIGURE 2, the pylon does not require to have a width equal to the length of a cartridge since the maximum twisting acting imparted to a cartridge may readily be carried out during the very first part 42 of its transference from the port 34, during which part it is within the pod.

Manoeuverability of the belt and cartridges by the forming of the chute is further illustrated in FIGURE 2 in which the chute is seen to substantially follow the contour of the pylon and pod, i.e. rotating the cartridges about axes parallel to that of the pod, during the latter part of their being turned from a vertically upward to a forwardly pointing attitude. On arrival at the gun the cartridges are hence in an attitude for firing.

As best seen in FIGURE 2, a further chute 52 is present for receiving the spent links from the gun.

Since these links can be used again, they are conveniently transported from the gun and stored in the centre bay 22 of the pod; this is a vacant region lying underneath the projecting part of the chute.

Preferably the assembly has a winch 48 located within the pylon forward of the chute 36. This may be used for hoisting the gun and the pod upwards from the ground to engage the aircraft.

A further preference is that the assembly should have a second winch 50 for hoisting an ammunition box upwards to lie within the ammunition bay.

I claim:

1. In combination, a gun pod, a gun, a tank, a chute and a pylon, said pylon being adapted to mount said gun pod on an aircraft, said tank being adapted to store cartridges, said gun pod enclosing both said gun and said tank, said chute being adapted to deliver said cartridges from said tank to said gun, a major part of said chute lying outwardly of the general outline of said gun pod and within said pylon, and said pylon being substantially narrower than said gun pod.

2. The combination as claimed in claim 1 in which said cartridges, when stored in said tank, lie transversely to the axis of said gun pod, and in which that part of said chute which lies between said tank and said major part of said chute is adapted to turn said cartridges to lie as near as possible to the direction which is perpendicular to both their stored position and the axis of the gun pod, while said cartridges are passing from said tank to said major part of said chute.

3. The combination as claimed in claim 1 in which said chute is adapted to restrain free lateral movement of the said cartridges during said delivery.

4. The combination as claimed in claim 1 and further including a gun lifting winch, said winch being rigidly mounted within said pylon, and being located above, and operatively connected to, said gun.

5. The combination as claimed in claim 1 and further including a tank lifting winch, said winch being rigidly mounted within said pylon, and being located above, and operatively connected to, said gun.

6. The combination as claimed in claim 1, and further including a second chute and a chamber, said chamber lying within said pod, and said second chute extending from said gun to said chamber, said combination being adaped to operate when said cartridges are interconnected by links, said links being adapted to hold adjacent cartridges in parallel relationship, and said gun being adapted to eject said links into said second chute as the cartridge associated with said links is fired.

References Cited

UNITED STATES PATENTS

| | | | |
|---|---|---|---|
| 2,364,510 | 12/1944 | Bertran et al. | 89—34 |
| 2,493,945 | 1/1950 | Cocks et al. | 89—37.5 |

SAMUEL FEINBERG, *Primary Examiner.*

BENJAMIN A. BORCHELT, *Examiner.*

S. C. BENTLEY, *Assistant Examiner.*